Sept. 8, 1931.  J. J. BARRY  1,822,121
REFRIGERATING APPARATUS
Filed Aug. 12, 1929  3 Sheets-Sheet 1

INVENTOR
James J. Barry.

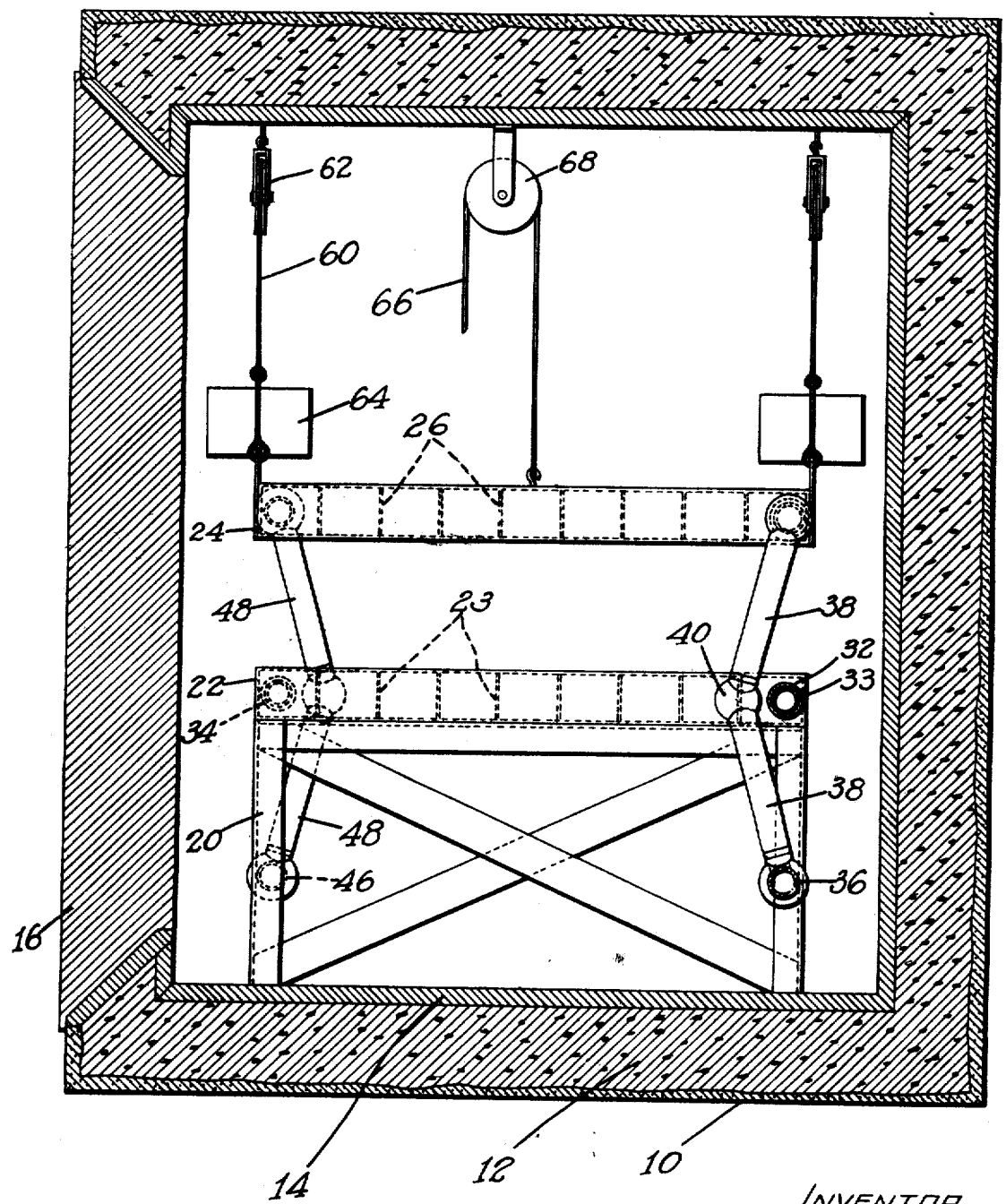

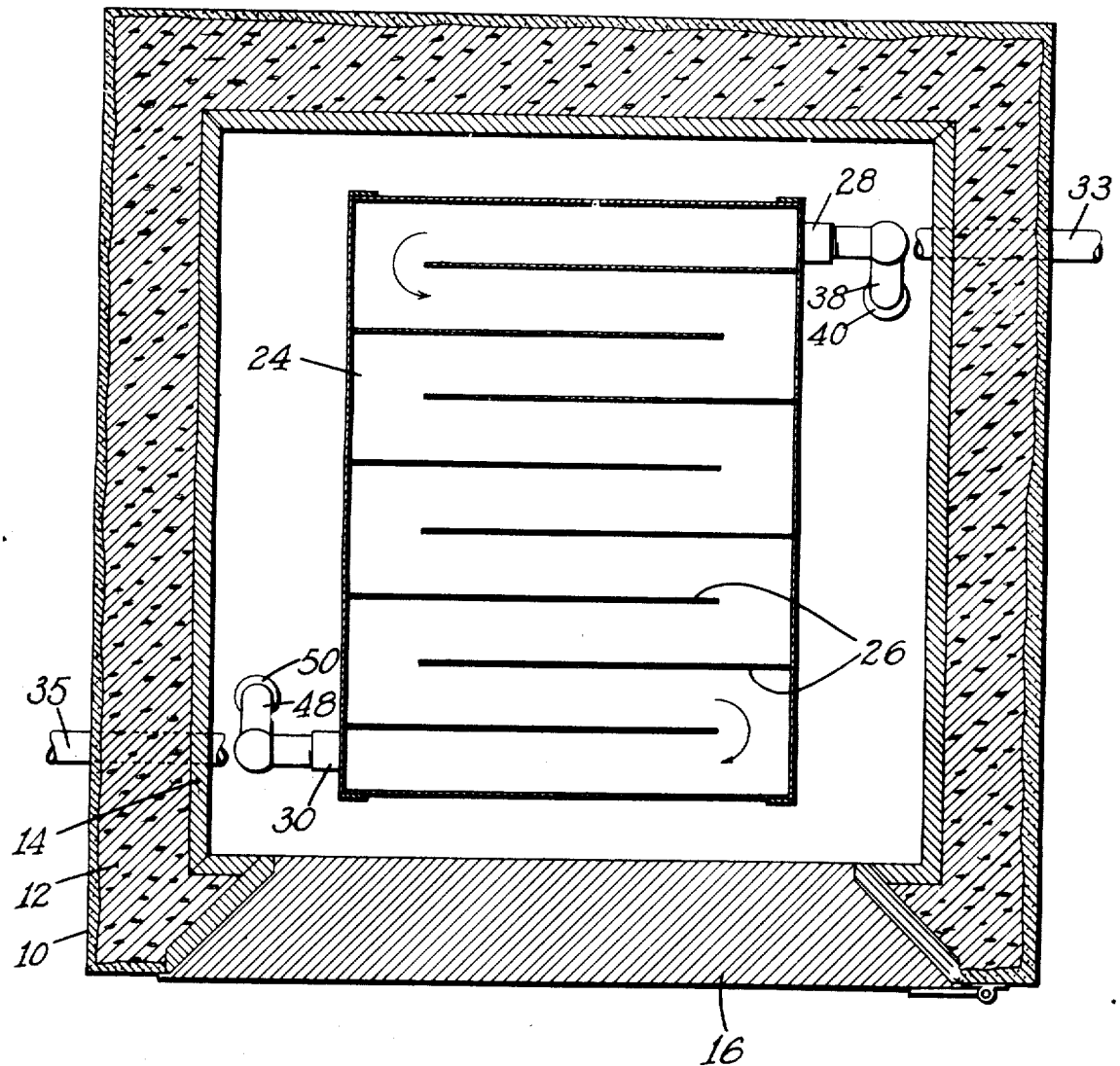

Patented Sept. 8, 1931

1,822,121

UNITED STATES PATENT OFFICE

JAMES J. BARRY, OF HALIFAX, NOVA SCOTIA, ASSIGNOR TO FROSTED FOODS COMPANY, INC., OF DOVER, DELAWARE, A CORPORATION OF DELAWARE

REFRIGERATING APPARATUS

Application filed August 12, 1929. Serial No. 385,385.

This invention relates to refrigerating apparatus of the type used for quick-freezing or chilling food products and to an improved method of freezing such products.

Food products are quick-frozen most successfully between heat conductive members which firmly engage the product upon opposite sides over a substantial area thereof, thus establishing intimate contact and ensuring uniform and rapid interchange of heat between product and the heat conductive members. Among other desirable factors, it is important that the unfrozen product should be engaged with a measured degree of pressure between appropriate limits such that, on the one hand, the shape of the product in its package or container may be maintained without distortion by crushing, but on the other hand, it should be engaged with sufficient pressure to cause the expansion of the product in freezing to take place internally, closing the voids in the product and thus solidifying the mass thereof. Provision must also be made for supplying an ample quantity of cooling medium to the heat conductive members at a relatively low temperature to maintain a pronounced temperature difference between the product and the surfaces engaging it, and thus ensure rapid heat interchange. The construction of the apparatus must also facilitate the presentation of the unfrozen product and the removal of the frozen product.

The present invention contemplates refrigeration apparatus embodying the desirable characteristics above discussed and others as will presently appear. In one aspect, accordingly, it comprises refrigeration apparatus in which flat, rigid heat-conducting members are arranged for relative movement to engage between them food product in any desired form, such members being associated with means for supplying cooling medium thereto in all relative positions.

As herein shown, the lower heat conductive member is used to support the product and is stationary while the upper heat conductive member is arranged to be raised when the product is presented to the apparatus and then lowered into engagement therewith. The pressure of the upper heat conductive member, in the illustrated embodiment of my invention, is due to gravity and is counterbalanced to bring it within suitable limits for the particular product in hand. This is one convenient construction for securing a measured degree of pressure upon the product to be frozen, and confers an important characteristic upon the apparatus. Any other mechanical expedient, however, in accordance with which the pressure of engagement between heat conductive plates is measured and maintained uniform between definite limits, regardless of the shape and thickness of the product being operated upon, would be within the scope of my invention.

In order to facilitate the presentation to the apparatus of the product to be frozen and its removal therefrom, the cooling medium is led to and from the heat conductive members by connections located upon opposite ends thereof, so that free and unobstructed space is provided on two sides of the apparatus. The product may thus be presented and removed from the same side or passed across the apparatus.

These and other features of the invention will be best understood and appreciated from the following description of a preferred embodiment thereof, selected for purposes of illustration and shown in the accompanying drawings in which.

Fig. 2 is a view in side elevation, the insulating chamber being shown in section; and Fig. 3 is a cross sectional view, on the line 3—3 of Fig. 1.

Figure 1:
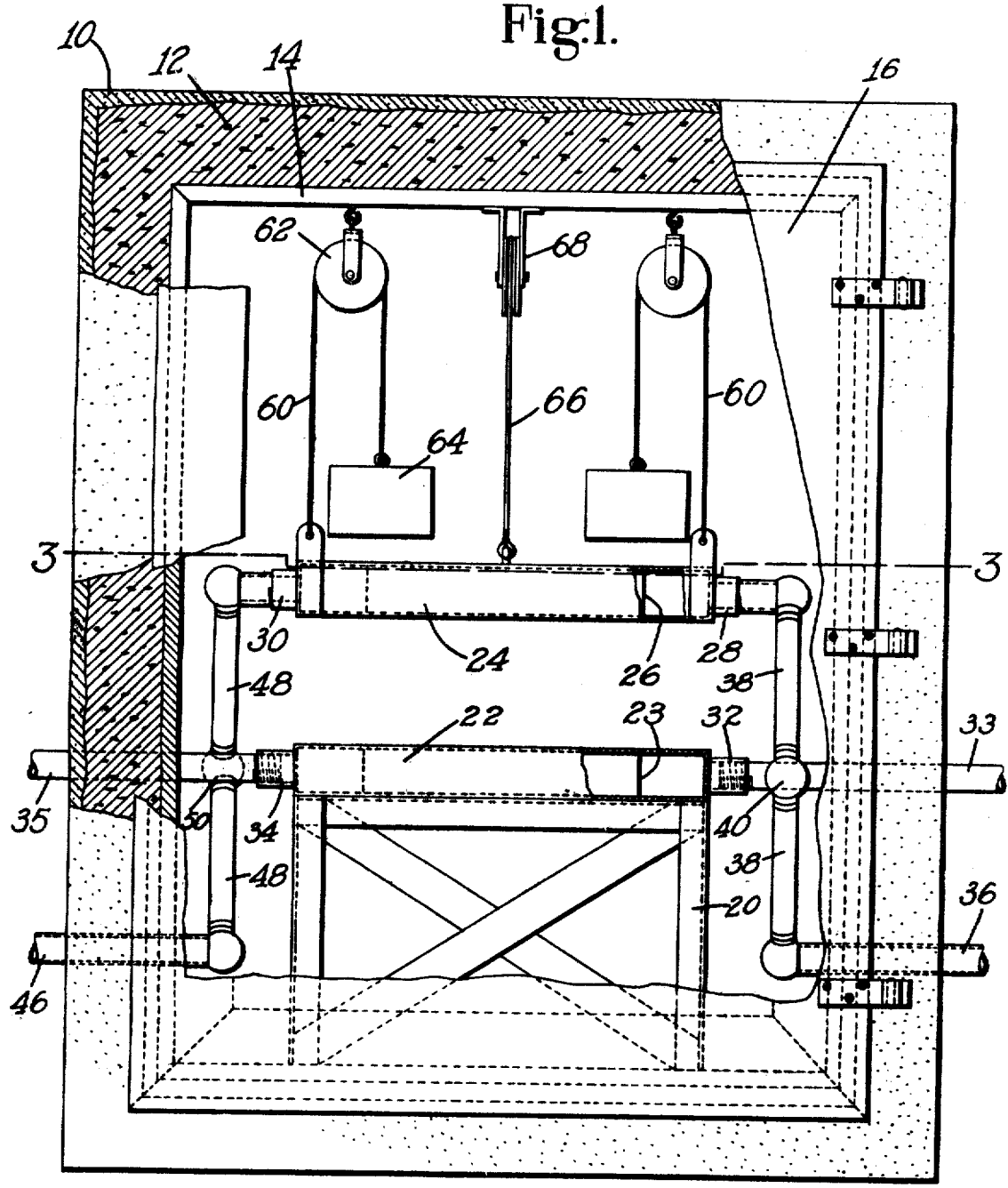
Fig. 1 is a view in front elevation, showing certain parts broken away.

For purposes of illustration, I have shown the apparatus as enclosed in an insulated chamber, comprising an outer casing 10, an inner casing 14, and a filler 12 of ground cork or other heat insulating material. The casing is provided with a hinged door 16 at its front side and is otherwise imperforate except for the pipe connections of the cooling system, to be presently described.

The character of the insulating enclosure is of secondary importance only, although for economy of refrigeration it is desirable to install the apparatus under conditions which will reduce its heat loss waste to a minimum.

Within the insulating chamber is provided a bench or support 20 for the lower stationary heat conductive member 22, while the upper heat conductive member 24 is suspended from the roof of the chamber. The members 22 and 24 comprise each a metallic rectangular plate or slab of similar construction. Each plate is hollow to receive the cooling medium which is thus directed into close proximity to its effective refrigerating face. As shown in Fig. 3, the plate 24 has a continuous vertical outer wall and its interior is broken by a series of staggered baffle plates 26, so that cooling medium supplied at one corner thereof must follow a sinuous path, traversing constantly the entire area of the plate and finally discharging at its diametrically opposite corner. A nipple 28 entering the vertical wall of the plate 24 at its rear right corner, as seen in Fig. 3, constitutes an inlet connection for the cooling medium, while a similar nipple 30, disposed in the wall of the plate 24 at its front left-hand corner, constitutes a discharge opening therefor. Similar nipples 32 and 34 are supplied in the lower plate 22 for admitting and discharging cooling medium.

The apparatus herein shown is well adapted to be operated with calcium chloride brine as a cooling medium and satisfactory results are secured when this is supplied in a concentration of about 33° Baumé and maintained at an average temperature of 45° below zero F. The precise nature of the cooling medium, however, is of secondary importance and I do not wish to be construed as limiting myself to the use of a liquid refrigerant.

As herein shown, the lower heat conductive plate 22 is provided with an inlet pipe 33 which leads to the inlet nipple 32 and with a discharge pipe 35 which leads from the discharge nipple 34. The interior of the plate 22 is provided with staggered baffle plates 23 for directing the flow of the cooling medium therein between the delivery and discharge points.

In order to maintain in all positions an operative connection with the movable upper plate 24, an inlet pipe 36 is provided which enters the insulated chamber through its side wall near the lower right-hand corner thereof and communicates with the inlet nipple 28 of the upper plate 24 through a flexible connection, including two lengths of flexible pipe 38 connected to an intermediate coupling and suitable elbows at their opposite ends. Similarly, in the left wall of the insulating chamber is provided an outlet pipe 46 which communicates with the outlet nipple 30 of the upper plate 24 through a flexible connection, comprising two lengths of flexible pipe 48 and an intermediate coupling 50. In the initial elevated position of the upper plate 24, each pair of flexible pipes 38 and 48 are bowed or disposed at an angle to each other so as to clear the stationary inlet pipe 33 and outlet pipe 35 of the lower plate. When the upper plate is lowered, the flexible pipes 38 and 48 bend, temporarily displacing the intermediate couplings inwardly.

It will be understood that calcium chloride brine is continuously supplied through the inlet pipes 33 and 36 from a brine cooler of any usual kind, circulated independently through the heat conductive plates 22 and 24, and returned through the outlet pipes 35 and 46 to the brine cooler to be recooled in a continuous uninterrupted cycle.

The upper plate 24 being of considerable weight is provided at each corner with a flexible connection 60 passing over a pulley 62 secured in the ceiling of the insulating chamber and connected to a counterweight 64. The counterweights are so designed as to compensate for a part of the weight of the upper plate 24 but the plate tends always to descend and to rest upon the lower plate or upon the interposed product to be frozen. In quick-freezing relatively dense food products such as fresh meat or fresh fish, a substantial amount of pressure is desirable and, consequently, relatively light counterweights are employed. In quick-freezing a more fragile food product, such as fruit, which would be damaged by crushing, a lighter pressure is desired and, consequently, a heavier set of counterweights is to be employed.

The heat-conductive plate 24 may be made sufficiently heavy to exert by its weight the maximum desired pressure upon the product; any less pressure may be secured by the action of the counterweights 64, the effect of which may be varied in accordance with the requirements of the product being treated.

Any convenient means may be provided for raising and lowering the plate 24. As herein shown, a cord 66 is provided which passes over a pulley 68 secured to the ceiling of the insulating chamber over the center of the plate. By this means the plate 24 may be elevated and held in position, as shown in Figs. 1 and 2, while the product to be frozen is placed and arranged upon the lower plate 22. When this has been accomplished, the cord 66 is released and the upper plate lowered, descending upon the product with the desired measured pressure. The insulating chamber may then be closed and the contents of the apparatus quick-frozen in an interval depending upon the particular charge being handled and the rate of supply of the cooling medium. At the conclusion of the quick-freezing operation, the plate 24 is again elevated and the frozen contents of the apparatus are exposed for convenient removal.

The food product to be quick frozen may be presented to the apparatus in any desired form but preferably packed in flat rectangular cartons which, by the quick-freezing process, are converted into consumer packages, ready for immediate shipment and distribution. Under these conditions, the moist and plastic food product is shaped in packing to the interior of the carton, and the shape of the carton is maintained during the freezing operation by being confined between the heat conductive plates of the apparatus.

Having thus described my invention, what I claim as new and desire to secure by Letters Patent of the United States is:

1. Apparatus for freezing food products, comprising a stationary hollow heat conductive plate for supporting the product to be frozen, brine circulating connections for said plate, a cooperating hollow heat conductive plate movably mounted above and in vertical alignment with said first plate, a brine circulating system operatively connected to said second plate in all positions threreof, means for moving said second plate vertically with relation to said first plate to accommodate and compress between said plates products of varied thicknesses, and means, such as counterweights connected to said plate at symmetrically disposed points, for regulating the pressure exerted by said second plate on the product engaged between the two plates.

2. Refrigeration apparatus for food products, comprising a stationary supporting plate for the product to be frozen, a cooperating heat conductive plate movable vertically above the supporting plate and arranged to rest by gravity upon the product supported thereby, means for limiting the pressure of engagement, and means for circulating a cooling medium through said movable plate in all positions thereof.

3. Refrigeration apparatus for food products, comprising a pair of cooperating heat conductive members similarly shaped and mounted for relative vertical movement to engage and press between them products of various dimensions, means for limiting the pressure of engagement to an amount less than the weight of the uppermost member, and a circulating system for cooling medium operatively connected to said member in all positions thereof.

4. Refrigeration apparatus for food products, comprising a stationary refrigerated support for the product to be frozen, a cooperating heat conductive plate movably mounted above the support and arranged to rest upon an interposed product, means for raising and lowering said plate, counterweights connected thereto at symmetrically disposed points and acting to limit the pressure of engagement upon the product, and a brine circulating system connected to said plate in all positions thereof.

5. Refrigeration apparatus for food products, comprising cooperating heat conductive plates mounted in vertical alignment with each other and having parallel brine passages therein, independent brine connections communicating at similar locations with the respective plates and arranged to permit the relative movement thereof, the plates normally approaching each other in a manner adapted to press a product therebetween with a predetermined pressure, and means for separating the plates.

6. Refrigeration apparatus for food products, comprising cooperating hollow heat-conductive plates arranged for relative movement to receive between them a product to be frozen, means for causing cooling medium to circulate through the plates, and means whereby the plates engage and press a product placed therebetween with a predetermined pressure.

7. Apparatus for refrigerating food products comprising two hollow heat-conductive plates supported in spaced relation and adapted to engage between them food products of varying thicknesses and maintain under continuous, predetermined pressure a product thus engaged, and means for causing a cooling medium to circulate through said plates.

8. Apparatus for the refrigeration of food products comprising two heat-conductive plates supported in spaced relation to engage and compress between them food products of varying thicknesses, and means for causing cooling medium to circulate through said plates, whereby said food is refrigerated through the agency of said plates.

9. Apparatus for freezing foods comprising a hollow heat-conductive plate adapted to support a food product, a second hollow heat-conductive plate in adjustable spaced relation to said first plate, means to engage with said second plate the upper surface of a food product supported by said first plate with a measured pressure, and means for circulating a freezing medium through said plates, whereby said food will be refrigerated to any desired degree through the agency of said plates.

10. Apparatus for freezing food products comprising two hollow plates supported in spaced relation and adapted to engage between them food products of varying thicknesses and to maintain a product therebetween under uniform and predetermined pressure, and means to pass a cooling medium through said plates to refrigerate said product while engaged and compressed by said plates.

11. Apparatus for freezing food products comprising a hollow plate, a second plate supported in spaced relation to said first plate, and means to adjust said spaced relation whereby a product placed between said plates will be engaged and compressed between said plates with a measured pressure, and means for passing a cooling medium through said hollow plate to refrigerate said product.

12. Apparatus for refrigerating food products, comprising chambered heat-conductive plates having plane oppositely-disposed product-engaging faces, connections for circulating a cooling medium through said plates to refrigerate the product engaged between them, and means for separating the plates, said means and said connections being so disposed as to leave two sides of the plates free and unobstructed for the presentation and removal of the product.

13. The method of quick-freezing a food product between relatively separable heat-conductive plates which consists in placing the food products between said plates and lowering the upper plate to rest on said food product by its own weight while counterbalancing the same to apply a measured degree of pressure to said food product.

14. The method of quick-freezing a packaged food product between stationary heat-conductive plates which consists in separating said plates and placing therebetween the packaged product to be frozen and resting the upper plate by its own weight on said product to engage and press the same therebetween while refrigerating said plates.

15. Apparatus for quick-freezing food products, comprising a stationary horizontally disposed refrigerated plate for supporting the product to be frozen, a cooperating plate arranged to be placed upon the product so supported and to exert pressure thereon over the entire upper surface thereof, and means for delivering a liquid refrigerant to the upper plate to refrigerate the latter without coming into contact with the product interposed and pressed between the plates.

J. J. BARRY.

tween under uniform and predetermined pressure, and means to pass a cooling medium through said plates to refrigerate said product while engaged and compressed by said plates.

11. Apparatus for freezing food products comprising a hollow plate, a second plate supported in spaced relation to said first plate, and means to adjust said spaced relation whereby a product placed between said plates will be engaged and compressed between said plates with a measured pressure, and means for passing a cooling medium through said hollow plate to refrigerate said product.

12. Apparatus for refrigerating food products, comprising chambered heat-conductive plates having plane oppositely-disposed product-engaging faces, connections for circulating a cooling medium through said plates to refrigerate the product engaged between them, and means for separating the plates, said means and said connections being so disposed as to leave two sides of the plates free and unobstructed for the presentation and removal of the product.

13. The method of quick-freezing a food product between relatively separable heat-conductive plates which consists in placing the food products between said plates and lowering the upper plate to rest on said food product by its own weight while counterbalancing the same to apply a measured degree of pressure to said food product.

14. The method of quick-freezing a packaged food product between stationary heat-conductive plates which consists in separating said plates and placing therebetween the packaged product to be frozen and resting the upper plate by its own weight on said product to engage and press the same therebetween while refrigerating said plates.

15. Apparatus for quick-freezing food products, comprising a stationary horizontally disposed refrigerated plate for supporting the product to be frozen, a cooperating plate arranged to be placed upon the product so supported and to exert pressure thereon over the entire upper surface thereof, and means for delivering a liquid refrigerant to the upper plate to refrigerate the latter without coming into contact with the product interposed and pressed between the plates.

J. J. BARRY.

DISCLAIMER 1,822,121.—*James J. Barry*, Halifax, Nova Scotia. REFRIGERATING APPARATUS. Patent dated September 8, 1931. Disclaimer filed March 17, 1943, by the assignee, *General Foods Corporation*.

Hereby enters this disclaimer to claims 1 to 13, inclusive, and 15, in said specification.

[*Official Gazette April 13, 1943.*]

DISCLAIMER 1,822,121.—*James J. Barry*, Halifax, Nova Scotia. REFRIGERATING APPARATUS. Patent dated September 8, 1931. Disclaimer filed March 17, 1943, by the assignee, *General Foods Corporation*.

Hereby enters this disclaimer to claims 1 to 13, inclusive, and 15, in said specification.

[*Official Gazette April 13, 1943.*]